(No Model.)
J. HARTNESS.
CLUTCH OPERATING MECHANISM.
No. 483,741. Patented Oct. 4, 1892.
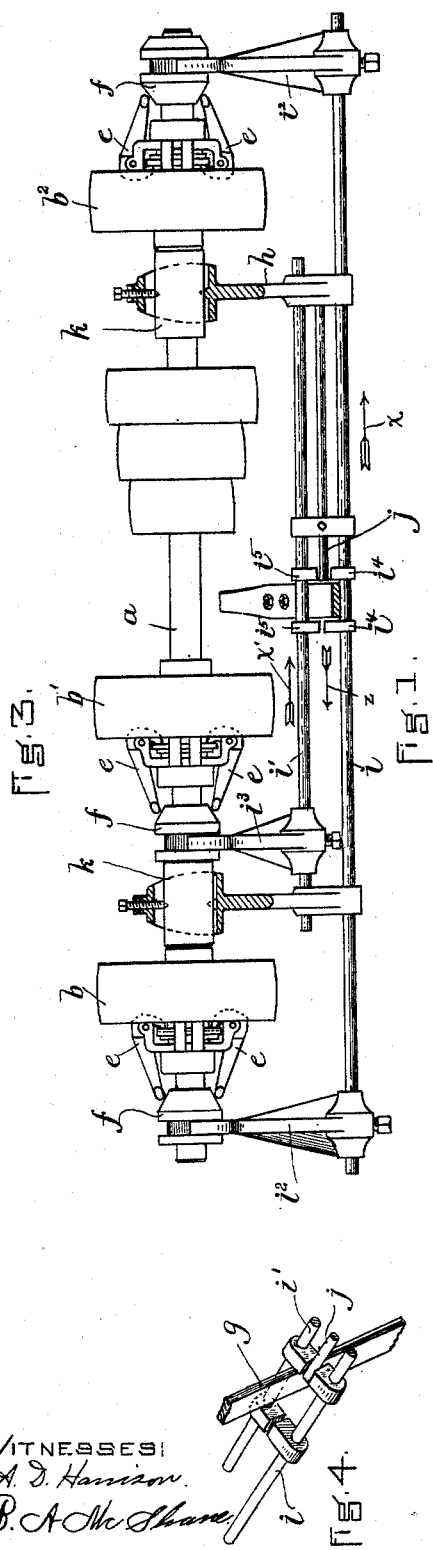
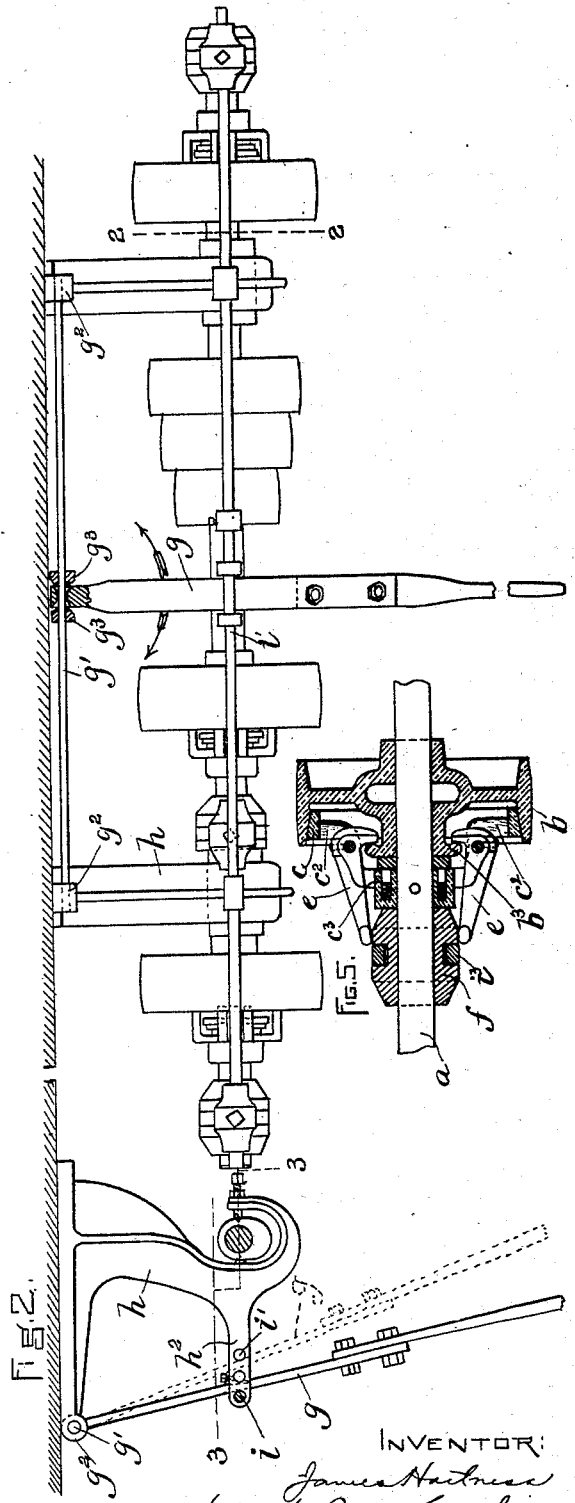
WITNESSES:
A. D. Harrison.
B. A. McShane.
INVENTOR:
James Hartness
by Wright Brown Crosley
Attys.

UNITED STATES PATENT OFFICE.

JAMES HARTNESS, OF SPRINGFIELD, VERMONT.

CLUTCH-OPERATING MECHANISM.

SPECIFICATION forming part of Letters Patent No. 483,741, dated October 4, 1892.

Application filed February 15, 1892. Serial No. 421,517. (No model.)

*To all whom it may concern:*

Be it known that I, JAMES HARTNESS, of Springfield, in the county of Windsor and State of Vermont, have invented certain new and useful Improvements in Clutch-Operating Mechanism for Counter-Shafts, of which the following is a specification.

This invention relates to counter-shafts having a plurality of loose pulleys and a corresponding number of clutch members adapted to connect said pulleys with the shaft to cause the rotation of the pulleys.

The invention has for its object to provide clutch operating or shipping mechanism comprising a single lever adapted to be grasped and moved by the operator and two independently-movable rods, one connected with one clutch member or group of clutch members on the shaft and the other connected with another clutch member or group of clutch members, the arrangement being such that said lever may be caused to give motion to either rod at the will of the operator, so that the single lever can be moved to make either clutch member or group of clutch members operative without affecting the other clutch member or group of clutch members. This result I attain by the devices which I will now proceed to describe.

Of the accompanying drawings, forming part of this specification, Figure 1 represents a side elevation of a counter-shaft provided with a series of loose pulleys and with clutch-operating mechanism therefor embodying my invention. Fig. 2 represents a section on line 2 2, Fig. 1, looking toward the left. Fig. 3 represents a section on line 3 3, Fig. 2, and a plan view of the parts below the line 3 4, Fig. 2. Fig. 4 represents a perspective view of a part of the construction shown in the preceding figures. Fig. 5 represents a sectional view of one of the pulleys and the clutch member that connects it with the shaft.

The same letters of reference indicate the same parts in all the figures.

In the drawings, $a$ represents a counter-shaft, and $b$ $b'$ $b^2$ represent loose pulleys supported thereby and adapted to rotate independently. The shaft is provided with suitable clutch members, one for each pulley, said clutch members being adapted to rotate with the shaft. The construction and arrangement of the pulleys and clutch members are such that an operative connection between each pulley and the corresponding clutch member may be effected to cause the pulley to rotate with the shaft. Said connection may be established in any suitable way, either by a movement of the clutch member upon the shaft into engagement with the pulley or by a movement of the pulley into engagement with the clutch member. In the present instance I have shown the clutch member as having no endwise movement upon the shaft and the pulley as movable toward and from the clutch member, the pulley being provided with an internal friction-surface, which is adapted to engage a ring $c$, which is connected by arms $c^2$ to a hub $c^3$, rigidly affixed to the shaft. The hub of the pulley is provided with a flange $b^3$, which is engaged with the shorter arms of bell-crank levers $e$, pivotally connected to the arms $c^2$. The longer arms of said levers bear upon a conical sleeve or collar $f$, which is movable upon the shaft $a$, and when moved in one direction moves the longer arms of said levers outwardly, thus causing their shorter arms to press against the flange $b^3$, and thus force the friction-surface of the pulley into contact with the ring $c$. A movement of the sleeve $f$ in the opposite direction releases the levers and permits the separation of the friction-surface of the pulley from operative contact with the ring $c$. The said clutch and its operating devices are shown and claimed in another application for Letters Patent, Serial No. 421,518, filed by me concurrently herewith; but I desire to state that so far as the subject-matter of the present application is concerned I do not limit myself to the described clutch devices or means for connecting the loose pulleys with the shaft and may use any other suitably-constructed clutch mechanism adapted to be operated by the devices hereinafter described.

In carrying out my invention I provide a shipper-lever $g$, which is hung from a suitable support in such manner that it can oscillate in different planes—that is to say, it has an oscillating movement in the directions indicated by the arrows in Fig. 1, and is also adapted to be oscillated in a direction at right angles to the direction indicated by said arrows, so that it can occupy either of the two positions shown in Fig. 2. I prefer to support said lever by means of a rod $g'$, affixed to supports or bearings $g^2$, formed on the hangers $h$, which support the counter-shaft $a$, the upper end of the lever having an orifice to receive the rod $g'$, which orifice is enlarged at its ends to permit the oscillation of the lever, as indicated by the arrows in Fig. 1, the lever being adapted to turn freely on the rod $g$ in a direction at right angles to that indicated by said arrows. $g^3 g^3$ represent collars affixed to the rod $g'$ at opposite sides of the lever $g$ for the purpose of keeping said lever in place upon the rod.

In connection with the lever $g$ I employ two shipper-rods $i$ and $i'$. Said rods are arranged in different planes, or, in other words, in different lateral positions, each rod being parallel with the counter-shaft and with the other rod, and are independently movable in guides $h^2$, which are preferably arms or extensions formed on the hangers $h$. The rod $i$ is provided with two arms $i^2 i^2$, the outer ends of which are forked and engaged with grooves in the conical collars $f$, which actuate the clutch mechanism whereby the pulleys $b$ and $b^2$ are connected with the shaft $a$, the arrangement being such that a movement of the rod $i$ in the direction indicated by the arrow $x$ in Fig. 3 will operate the clutch devices of the pulley $b$, so as to connect said pulley with the shaft $a$, and will release the clutch devices of the pulley $b^2$, so as to make said pulley loose upon the shaft. The rod $i'$ is provided with an arm $i^3$, the forked outer end of which is engaged with the collar $f$, which operates the clutch devices of the pulley $b'$, the arrangement being such that a movement of the rod $i'$ in the direction indicated by the arrow $x'$ in Fig. 3 will cause the connection of the pulley $b'$ with the shaft $a$. The lever $g$ is located between the rods $i$ and $i'$, and when said lever is in the position shown in full lines in Fig. 2 it is adapted to engage collars $i^4 i^4$, affixed to the rod $i$; but when moved to the position indicated in dotted lines in Fig. 2 said lever is adapted to engage collars $i^5 i^5$ on the rod $i'$. It will be seen that when the lever is engaged with the collars of either rod a movement of the lever in the direction indicated by either of the arrows in Fig. 1 will cause it to move said rod endwise and thus make the pulley $b$ fast and the pulley $b^2$ loose on the shaft, or vice versa. When the lever $g$ is in the position shown in Fig. 4 and in dotted lines in Fig. 2, it is engaged with the collars $i^5$, so that it is adapted to move the rod $i'$ to make the pulley $b'$ fast or loose, as the case may be. If desired, the rod $i'$ may be connected with two clutch devices instead of one; but in the arrangement here shown, the rod $i'$ being connected with only one clutch device, it is desirable to provide means to prevent the possibility of the simultaneous movement of the rods $i i'$ by the lever when the latter is in an intermediate position or in such position as to bear at the same time on both the collar $i^4$ and the collar $i^5$. To this end I interpose between two of the collars $i^4 i^5$ a fixed stop $j$, which is here shown as a rod affixed to one of the hangers $h$, said stop being arranged to prevent movement of the lever $g$ in the direction indicated by the arrow in Fig. 1, when said lever is in position to bear simultaneously on the collars $i^4 i^5$. A similar rod or stop $j$ might be located on the opposite side of the lever $g$ if the rod $i'$ were adapted to operate two clutch members instead of one; but in the present case the motion of the rod $i'$ in the direction of the arrow $z$ in Fig. 3 is prevented by contact of the conical collar $f$, connected with said rod with one of the bearings $k$, in which the shaft $a$ is journaled.

It will be seen that by the described improved mechanism two shipper-rods may be operated by one shipper-lever. Hence the construction of the clutch-operating mechanism where three or more clutch members are required upon one shaft is materially simplified.

As already stated, my improved clutch-operating mechanism is not confined to use in connection with the particular clutch devices here shown and described, as the arms $i^2 i^3$, which communicate motion from the rods $i i'$, may act through any other suitable means to connect the loose pulleys with and disconnect them from the driving-shaft.

The motion of the shipper-rod $i$ in one direction will throw one clutch member into operation and cause the counter-shaft to impart a given speed or a given direction of rotation, while the motion of said rod in the opposite direction will throw another clutch member into operation, giving either a different speed or a different direction of rotation, the direction of rotation being determined by the belts running on the pulleys made operative by the clutch members. The rod or stop $j$ is so arranged that the shipper-lever $g$ cannot be moved from the position it occupies in operating the rod $i'$ into position to operate the rod $i$ until the clutch member connected with the rod $i'$ is in an inoperative position. The two clutch members operated by the rod $i$ are arranged so that one must be inoperative when the other is operative, and the stop $j$ is arranged so that the lever $g$ cannot be moved from position to operate rod $i$ into position to operate rod $i'$ until both clutch members operated by rod $i$ are inoperative. Hence only one of the entire series of clutch members can be made operative at a time. Any other suitable means for producing the above-described results—viz., requiring the shipper-lever to leave each rod in an inoperative position before moving to position to operate another rod—may be substituted for the stop $j$.

It is obvious that more than two shipper-rods may be operated by one lever $g$, the arrangement being such that said lever leaves each rod in an inoperative position before moving to position to operate another rod.

I claim—

1. The combination, with a shaft having a plurality of loose pulleys and pulley-engaging clutch members, of a plurality of shipper-rods arranged in different planes or lateral positions, connections between said rods and the clutch members, whereby the clutch members are made operative when the rods are moved endwise, the arrangement being such that a movement of one rod in one direction will operate a clutch member connected therewith, while a movement of another rod in the opposite direction will operate a clutch member connected with the last-mentioned rod, and a shipper-lever adapted to oscillate in different planes, whereby said lever may be engaged with and move either rod independently, as set forth.

2. The combination of a counter-shaft having a plurality of loose pulleys and pulley-engaging clutch members, two shipper-rods movable lengthwise parallel with the shaft, connections between one of said rods and a clutch member on the shaft, arranged to make the clutch member operative by a movement of said rod in one direction, connections between the other rod and another clutch member, arranged to make the last-mentioned clutch member operative by a movement of the rod in the opposite direction, a shipper-lever adapted to assume either of two operative positions and to engage and move either rod, and means for preventing the rod-operating movement of said lever when it is in an intermediate position, as set forth.

3. The combination of a counter-shaft having a plurality of loose pulleys and pulley-engaging clutch members, the latter being affixed to the shaft, the levers pivoted to the clutch members and adapted to move the pulleys into engagement with the clutch members, the conical collars on the shaft, adapted to actuate said levers, the two shipper-rods movable parallel with the shaft and provided with shipper-arms engaged with said collars, and the shipper-lever adapted to engage and move either rod, as set forth.

4. The combination of a counter-shaft having a plurality of loose pulleys and pulley-engaging clutches, a plurality of independently-movable shipper-rods, each connected with one or more of said clutches, and a shipper-lever adapted to be engaged with and move either rod, as set forth.

5. The combination of a counter-shaft having a plurality of loose pulleys and pulley-engaging clutch members, a plurality of independently-movable shipper-rods, each connected with one or more of said clutch members, a shipper-lever adapted to be operated in different positions, as described, and means for preventing the movement of said lever from one position to another, excepting when the shipper-rod last operated is in an inoperative position, as set forth.

In testimony whereof I have signed my name to this specification, in the presence of two subscribing witnesses, this 15th day of January, A. D. 1892.

JAMES HARTNESS.

Witnesses:
OTIS GRIDLEY,
W. D. WOOLSON.